United States Patent Office 2,877,271
Patented Mar. 10, 1959

2,877,271

PREPARATION OF IONONES BY CYCLIZATION OF PSEUDOIONONES WITH SULFURIC ACID

Solomon Kaiser, Florham Park, and Walter Kimel, Highland Park, N. J., assignors to Hoffmann-La Roche Inc., Nutley, N. J., a corporation of New Jersey No Drawing. Application November 27, 1957
Serial No. 699,201

9 Claims. (Cl. 260—587)

This invention relates to improvements in cyclization processes. More particularly, it relates to improvements in processes for the preparation of nuclearly unsaturated ionones by the cyclization of a pseudoionone by means of an acidic cyclizing agent.

Processes of this character have been carefully investigated, and employed extensively, by prior workers in the field. The prevailing view has been that the choice of preferred acidic condensing agent is conditioned by the type of ionone product which it is desired to produce, and especially whether the ionone product which it is desired to produce in major proportion is in the alpha or beta series. Thus, in a paper by Krishna et al., J. Org. Chem., 22, 224–226 (1957) it is stated, at page 225, that:

"The relative proportions of the α- and β-isomers obtained on cyclization of pseudoionone are dependent on the cyclizing agent employed, sulfuric acid giving mainly β-ionone and phosphoric, fumaric and other weaker acids giving mainly the α-isomer." [Footnote reference omitted.]

For the preparation of β-ionone of suitable quality for use in the manufacture of synthetic vitamin A, Krishna et al. (loc. cit.), following the earlier well known work of Royals, recommend the use of a mixture of concentrated sulfuric acid and glacial acetic acid.

On the other hand, in the irone group, and particularly for the preparation of α-irone of a high quality suitable for perfumery use, Naves prefers the use of boron trifluoride as a cyclizing agent, see his U. S. Patent 2,517,800. The use of sulfuric or phosphoric acid cyclizing agents is contraindicated by Naves in the patent referred to, as resulting in a less desirable form of α-irone. Another worker in the field, Schinz (see his U. S. Patent 2,740,817) agrees with Naves at least to the extent of excluding straight sulfuric acid from serious consideration in the preparation of α-irone. Schinz' claimed process for the preparation of α-irone rests on the use, as cyclizing agent, of either phosphoric acid or a mixture of sulfuric and acetic acids.

The upshot of the matter is that one of the commonest commercially available acids, sulfuric acid, has not been deemed in the most recent prior art to be a desirable cyclization agent, per se, for either α-ionone, β-ionone or α-irone. The latter are the three ionones which are at present of greatest industrial importance. It follows that, according to the best and most recent teachings, a manufacturer contemplating the production of a full line of ionones must face the necessity for setting up a plurality of plant procedures, employing various cyclization agents which differ as to cost, accessibility, corrosion characteristics, etc.

A second feature of prior art processes for the production of ionones by acidic cyclization of pseudoionones is that the ring closure reactions have generally been conducted in homogeneous (i. e. one-phase) systems. The reaction mixtures in such prior art practice are often rather viscous, especially at the low temperatures required for the preparation of some of the important ionones, e. g. β-ionone. Great difficulties have been encountered in providing simple means for stirring the reaction mixture; these are particularly evidenced in large scale commercial installations.

The present invention advances over the prior art by providing a manufacturing procedure for nuclearly unsaturated ionones which is characterized by its flexibility and ease of operation and by the cheapness and economy of the cyclization agent employed; and this procedure avoids the difficulties of prior art processes. More particularly, the invention provides a process which comprises contacting a pseudoionone having the formula

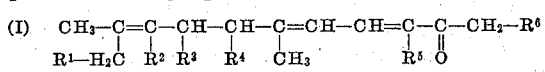

wherein each of the symbols $R^1$, $R^2$, $R^3$, $R^4$, $R^5$ and $R^6$ represents a member selected from the group consisting of hydrogen and lower acyclic hydrocarbon radicals, with an agitated mixture comprising essentially a liquid saturated hydocarbon and sulfuric acid having a concentration of from about 60% to about 100%, at a temperature between about minus 20° C. and about 25° C., thereby forming a product comprising essentially nuclearly unsaturated ionones selected from the group consisting of those having the formulas (II)

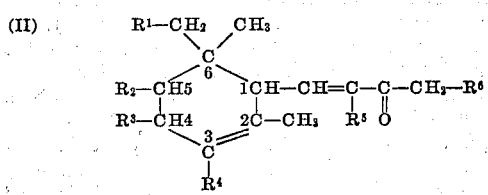

and (III)

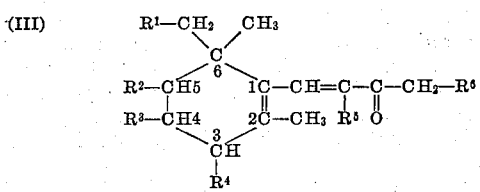

wherein each of the symbols $R^1$, $R^2$, $R^3$, $R^4$, $R^5$ and $R^6$ has the same meaning indicated above.

An important feature of the process according to the present invention is the fact that the cyclization reaction is conducted in a heterogeneous (two-phase) system. The liquid hydrocarbon referred to above is employed in an amount sufficient to dissolve the pseudoionone starting material; and after cyclization of the latter, the liquid hydrocarbon medium also retains the ionone product in solution. The sulfuric acid cyclization agent, however, does not dissolve in the liquid hydrocarbon medium. In order to effect efficient contact between the pseudoionone and the sulfuric acid, it is necessary that the reaction mixture be agitated vigorously, as by an efficient stirrer. A preferred procedure comprises dissolving the pseudoionone reactant in a portion of the liquid hydrocarbon and adding the resulting solution slowly to a well stirred mixture containing the sulfuric acid cyclization agent and the remainder of the liquid hydrocarbon.

The liquid hydrocarbon is employed in a volume at least about twice that of the pseudoionone reactant. Preferably, about four volumes of liquid hydrocarbon are employed for each volume of pseudoionone reactant. Greater amounts of liquid hydrocarbon can be employed if desired, without departing from the teaching of the invention, the maximum amount being limited only by considerations of economy and equipment capacity. Ordinarily, the liquid hydrocarbon need not be used in a larger quantity than is required to facilitate the easy stirring of the reaction mixture.

Suitable hydrocarbon materials for use in the processes herein include various liquid materials which are substantially entirely composed of hydrocarbons; which are substantially entirely saturated and substantially entirely aliphatic or cycloaliphatic in character; and which boil below about 130° C. Illustrative examples include n-pentane; n-hexane; n-heptane; cyclohexane; and petroleum ether, naphtha, ligroin and other petroleum fractions having the chemical characteristics above referred to and boiling in a range between about 30° C. and about 100° C. Several commercially available solvents have been used advantageously, including Skellysolve-B (essentially a normal hexane fraction boiling in the range of from about 140° F. to about 160° F.), Skellysolve-C (essentially a normal heptane fraction boiling in the range of from about 190° F. to about 212° F.), Amsco Normal Hexane (essentially a hexane petroleum fraction, boiling range about 152° F. to about 156° F.), and Amsco Normal Heptane (essentially a heptane petroleum fraction, boiling range about 205° F. to about 209° F.). For the preparation of α- or β-ionone or α-irone, it is preferred to use a liquid saturated, substantially aliphatic hydrocarbon boiling in a range between about 30° C. and about 100° C., e. g. Skellysolve-B or Skellysolve-C.

The concentration of the sulfuric acid employed is selected with reference to the character of ionone desired, i. e. whether it is desired to produce an ionone of the alpha series (e. g. α-ionone, α-irone, 3-ethyl-α-ionone) or an ionone of the beta series (e. g. β-ionone, β-irone). In general, the more concentrated the acid, the greater is the proportion of beta isomer in the ionone product. For the preparation of an ionone which is predominantly beta in character, it is preferred to use sulfuric acid having a concentration between about 93% and about 100%. For the preparation of an ionone which is predominantly alpha in character, it is preferred to use sulfuric acid having a concentration between about 60% and about 85%. Ordinarily the sulfuric acid cyclizing agent is employed in a ratio of from about 1.5 to about 4 parts by weight of acid agent for each part by weight of pseudoionone starting material, Formula I above; a preferred ratio is from about 2.5 to about 3 parts by weight of acid cyclizing agent per part by weight of starting material (I).

Similarly, the temperature of cyclization is selected with reference to the character of product desired. In general, the lower the temperature of cyclization, the greater the proportion of beta isomer in the ionone product. For the preparation of an ionone which is predominantly beta in character, it is preferred to conduct the cyclization reaction at temperatures between about minus 20° C. and about 0° C. For the preparation of ionones which are predominantly alpha in character, it is preferred to conduct the cyclization reaction at temperatures between about minus 10° C. and about 25° C.

In certain instances where it is desired to have an ionone product of a specified character, it is sometimes desirable to produce a mixture of ionones which is not classifiable as substantially all alpha or substantially all beta. In such a case the temperature of cyclization and/or the acid concentration are selected intermediate the ranges specified above. Thus, for example, an irone product having a fine raspberry odor and having special value in compounding of flavors can be made by employing sulfuric acid of about 70° concentration at a cyclization temperature ranging between about minus 5° C. and about 5° C.

One preferred embodiment of the invention relates to a process which comprises agitating a mixture comprising essentially pseudoionone, a liquid material containing essentially saturated aliphatic hydrocarbon having a boiling point between about 30° C. and about 100° C., and sulfuric acid having a concentration between about 93% and about 100%, at a temperature between about minus 15° C. and about 0° C., thereby forming a nuclearly unsaturated ionone product containing chiefly β-ionone.

A second preferred embodiment of the invention relates to a process which comprises agitating a mixture comprising essentially pseudoirone, a liquid material containing essentially saturated aliphatic hydrocarbon having a boiling point between about 30° C. and about 100° C., and sulfuric acid having a concentration between about 60% and about 65%, at a temperature between about 10° C. and about 20° C., thereby forming a nuclearly unsaturated irone product containing chiefly α-irone.

A third preferred embodiment of the invention relates to a process which comprises agitating a mixture comprising essentially pseudoirone, a liquid material containing essentially saturated aliphatic hydrocarbon having a boiling point between about 30° C. and about 100° C., and sulfuric acid having a concentration of about 70%, at temperatures between about minus 5° C. and about 5° C., thereby forming a mixture comprising chiefly nuclearly unsaturated irones and possessing a raspberry odor.

Starting materials of Formula I above are well known to those skilled in the art. Illustrative disclosures of such materials can be found in U. S. Patent No. 2,661,368 and British patent specification No. 784,891. It is preferred to use starting materials of Formula I wherein the symbols $R^1$, $R^2$, $R^3$, $R^4$, $R^5$ and $R^6$ represent members selected from the group consisting of hydrogen and lower alkyl radicals, e. g. methyl, ethyl, isobutyl and the like.

The invention is further disclosed in the following examples, which are illustrative but not limitative thereof. Temperatures are stated in degrees centigrade, uncorrected.

*Example 1*

A solution of 200 g. of pseudoionone (of 81.0% purity by ultraviolet spectrographic analysis) in 200 cc. of Skellysolve-B was cooled to minus 10°. Then, it was added, dropwise, with vigorous stirring, to a mixture of 500 g. of sulfuric acid (98%, tech.) and 600 cc. of Skellysolve-B, while maintaining a reaction temperature of minus 10°. After addition was complete (30 minutes), the mixture was allowed to warm to 0°, and was poured onto 2 liters of ice water. The aqueous layer was separated and was extracted with 300 cc. of Skellysolve-B. Finally, the organic layers were combined, and were washed successively with aqueous salt solution, 3 N aqueous NaOH solution, and again with salt solution until neutral. After drying, and evaporation of solvent, distillation afforded a product containing chiefly β-ionone, B. P. 87°–92° (1 mm.); $n_D^{25}$ 1.5181; yield, 150.0 g. (assay=94.1% β-ionone by U. V. spec. analysis).

*Example 2*

A solution of 200 g. of pseudoionone (of 84.8% purity by ultraviolet spectrographic analysis) in 200 cc. of Skellysolve-C was cooled to minus 10°. Then it was added, dropwise, to a well stirred mixture of 700 g. of sulfuric acid (93% tech.) and 600 cc. of Skellysolve-C, while maintaining a reaction temperature of minus 10°. After addition was complete, the mixture was allowed to warm to 0° and was poured onto 2 liters of ice water. The aqueous layer was separated and was extracted with 500 cc. of Skellysolve-C. The organic layers were then combined and were washed successively with aqueous salt solution, 3 N aqueous sodium hydroxide solution, and again with salt solution until neutral. The washed organic material was dried, the solvent was stripped off and the residue was fractionated. There was thus obtained 152 g. of an ionone product having $n_D^{25}$ 1.5178 and having an assay of 93.7% β-ionone (by ultraviolet spectrographic analysis).

Example 3

A solution of 200 g. of pseudoionone (of 81% purity by ultraviolet spectrographic analysis) in 200 cc. of Amsco Normal Hexane was cooled to minus 20°. Then it was added, dropwise, to a well stirred mixture of 500 g. of sulfuric acid (98%, tech.) and 300 cc. of Amsco Normal Hexane, while maintaining a reaction temperature of minus 20°. After addition was complete, the mixture was allowed to warm to 0° and was poured onto 1.5 liters of ice water. The aqueous layer was separated and was extracted with 500 cc. of Amsco Normal Hexane. The organic layers were then combined and were washed successively with aqueous salt solution, 3 N aqueous sodium hydroxide solution, and again with salt solution until neutral. The washed organic material was dried, the solvent was stripped off. On fractionation of the residue, there was obtained 147.5 g. of an ionone product having $n_D^{25}$ 1.5181 and having an assay of 94.3% β-ionone (by ultraviolet spectrographic analysis).

Example 4

To a vigorously stirred mixture of 600 g. of sulfuric acid (65%) and 600 cc. of Skellysolve-B was added, dropwise, at a reaction temperature of 10°, a solution of 200 g. of pseudoirone in 200 cc. of Skellysolve-B. After the addition was complete (45 minutes), stirring was continued for one hour at 10°. Then, the mixture was added rapidly, with stirring, to 1800 cc. of ice water. The mixture was allowed to settle, and the aqueous phase was separated and extracted with 300 cc. of Skellysolve-B. The latter was added to the original solvent layer, and the resulting solution was washed with saturated aqueous sodium bicarbonate and then with water until neutral. After removal of solvent in vacuo, the product was isolated by distillation at diminished pressure. There was obtained 157.8 g. of a product containing chiefly α-irone; B. P. 90°–95° (0.5 mm.); $n_D^{25}$ 1.4998. The product formed a 4-phenylsemicarbazone, M. P. 172°.

Example 5

The procedure described above was repeated, except that 60% sulfuric acid was employed, and the reaction was carried out at 20°. The product was worked up in the same manner as described above. There was obtained 163.3 g. of a product containing chiefly α-irone; B. P. 87°–92° (0.4 mm.); $n_D^{25}$ 1.4998.

Example 6

To a mixture of 500 g. of sulfuric acid (70%) and 600 cc. of n-hexane was added during 20 minutes, with rapid stirring, a solution of 200 g. of pseudoirone in 200 cc. of n-hexane. The temperature was maintained at 0° by a cooling bath. After all the pseudoirone solution had been added, the mixture was stirred for an additional ten minutes at that temperature. Then, it was added, with stirring, to 2 liters of ice water. The product was worked up by extraction, washing and distillation, as described in Example 1 above, affording 144.3 g. of a mixture of irones of B. P. 96°–102° (0.6 mm.) and $n_D^{25}$ 1.5032, possessing a fine, raspberry odor.

Example 7

A solution of 200 g. of pseudoirone in an equal volume of n-hexane was added slowly, with vigorous stirring, to a mixture of 500 g. of sulfuric acid (98%, tech.) and 600 cc. of n-hexane, at minus 10° to minus 12°. The solution was added during 55 minutes, and the reaction was then allowed to continue an additional 10 minutes at minus 10°. The mixture was poured onto 1800 cc. of ice water, and stirred 15 minutes. The aqueous layer was separated and was extracted with 200 cc. of n-hexane. This extract was combined with the other hexane layer, and was washed with 5% aqueous sodium carbonate solution, and then with water until neutral. The organic solution was dried with calcium sulfate, concentrated in vacuo, and distilled at diminished pressure. There was obtained 156.9 g. of a product comprising chiefly β-irone; B. P. 99°–104° (0.7 mm.); $n_D^{25}$ 1.5162; semicarbazone, M. P. 170°.

Example 8

A mixture of methylpesudoionones was prepared by condensation of citral with methyl ethyl ketone according to the method of Hibbert and Cannon, J. A. C. S., 46, 119 (1924).

A solution of 200 g. of the above mixture of methylpesudoionones in 200 cc. of n-hexane was added to a mixture of 600 g. of sulfuric acid (65%) and 600 cc. of n-hexane over a period of 55 minutes at 10°, with vigorous stirring. The reaction was allowed to continue for another hour at 10°, and then was quenched with 1800 g. of ice and water. The aqueous portion was separated and was extracted with n-hexane. This was combined with the main body of product, and was washed to neutrality. Evaporation of the solvent, followed by vacuum distillation of the residue, afforded 166.7 g. of a product comprising chiefly a mixture of iso- and n-methyl-ionone isomers, $n_D^{25}$ 1.4972.

Example 9

To a well-stirred mixture of 600 g. of sulfuric acid (65%) and 600 cc. of n-pentane was added, dropwise, a solution of 200 g. of 6,10-dimethyl-3,5,9-dodecatrien-2-one in 200 cc. of n-pentane. The solution was added during 45 minutes at 10°, and then the mixture was stirred an additional hour at that temperature. Finally, it was poured onto about 2 liters of ice water. The pentane layer was separated, and was neutralized by washing with 5% aqueous sodium carbonate, and then several times with water. Evaporation of solvent, and distillation at diminished pressure, afforded 154.4 g. of a product comprising chiefly 4-(6-ethyl-2,6-dimethyl-2-cyclohexenyl)-3-buten-2-one, B. P. 98°–102° (0.5 mm.); $n_D^{25}$ 1.5019.

The preparation of the starting material 6,10-dimethyl-3,5,9-dodecatrien-2-one is described in a prior application of Joseph Donald Surmatis, Serial No. 455,763, filed September 13, 1954, which issued on December 3, 1957, as U. S. Patent No. 2,815,379.

Example 10

A solution of 200 g. of 6,10-dimethyl-3,5,9-dodecatrien-2-one in an equal volume of n-heptane was added, over a period of 15 minutes, to a well-stirred mixture of 500 g. of sulfuric acid (98%) and 500 cc. of n-heptane. The reaction temperature was maintained at minus 8° to minus 12° by external cooling. After addition was complete, the temperature was allowed to increase to 0°, and stirring was continued another 5 minutes. Then, the mixture was poured onto a mixture of 1 kg. of ice and 1 liter of water, and stirred for 30 minutes. The organic layer was separated, and was washed with dilute aqueous sodium hydroxide solution and then with water until neutral. Finally, fractional distillation in vacuo gave 134.8 g. of a product comprising principally 4-(6-ethyl-2,6-dimethyl-1-cyclohexenyl)-3-buten-2-one, B. P. 100°–103° (0.3 mm.); $n_D^{25}$ 1.5175.

Example 11

In like manner to Example 9, 234 g. of 6,10,12-trimethyl-3,5,9-tridecatrien-2-one, in an equal volume of n-heptane, was cyclized at 10° by the action of 700 g. of sulfuric acid (65%) mixed with 700 cc. of n-heptane. The product was worked up in the manner described in Example 9, yielding 164.2 g. of material comprising chiefly 4-(6-isobutyl-2,6-dimethyl-2-cyclohexenyl)-3-buten-2-one, B. P. 104°–108° (0.2 mm.); $n_D^{25}$ 1.4971.

The preparation of the starting material 6,10,12-trimethyl-3,5,9-tridecatrien-2-one is described in a prior application of Joseph Donald Surmatis, Serial No.

506,079, filed May 4, 1955, which issued on December 3, 1957, as U. S. Patent No. 2,815,386.

*Example 12*

In like manner to Example 10, 234 g. of 6,10,12-trimethyl-3,5,9-tridecatrien-2-one, dissolved in 234 cc. of n-pentane, was cyclized at minus 10° by the action of 585 g. of sulfuric acid (98%) mixed with 685 cc. of n-pentane. After working up in the manner described in Example 10, there was obtained 158.8 g. of a product comprising principally 4-(6-isobutyl-2,6-dimethyl-1-cyclohexenyl)-3-buten-2-one, B. P. 112°–118° (0.2–0.3 mm.); $n_D^{25}$ 1.5103.

*Example 13*

A solution of 25.6 g. of 6,7,10-trimethyl-3,5,9-undecatrien-2-one in 13 cc. of cyclohexane was added, dropwise, with vigorous stirring, to a mixture of 74 g. of $H_2SO_4$ (60%) and 90 cc. of cyclohexane. The reaction temperature was maintained at 20° by external cooling. After addition was complete (one hour), stirring was continued for 20 minutes at 20°. Then, the mixture was poured into 500 cc. of ice water, and the product was worked up as described in Example 1 above. There was obtained 18.8 g. of a mixture containing principally 4-(2,3,6,6-tetramethyl-2-cyclohexenyl)-3-buten-2-one; B. P. 89–92° (0.75 mm.); $n_D^{25}$ 1.5012.

The preparation of the starting material 6,7,10-trimethyl-3,5,9-undecatrien-2-one is disclosed in a publication by Winter et al., Helvetica Chimica Acta, 30, 2213–15 (1947).

We claim:

1. In a process for the preparation of nuclearly unsaturated ionones by the cyclization of a pseudoionone with an acidic cyclizing agent, the improvement which comprises effecting the cyclization reaction in a liquid, substantially entirely saturated, hydrocarbon medium wherein sulfuric acid is the sole acidic cyclizing agent present.

2. A process which comprises contacting a pseudoionone having the formula

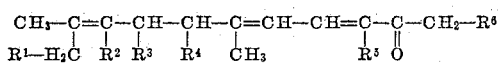

wherein each of the symbols $R^1$, $R^2$, $R^3$, $R^4$, $R^5$ and $R^6$ represents a member selected from the group consisting of hydrogen and lower acyclic hydrocarbon radicals, with an agitated mixture comprising essentially a liquid saturated hydrocarbon and sulfuric acid having a concentration of from about 60% to about 100%, at a temperature between about minus 20° C. and about 25° C., thereby forming a product comprising essentially nuclearly unsaturated ionones selected from the group consisting of those having the formulas

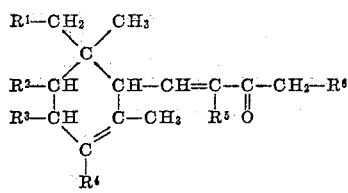

and

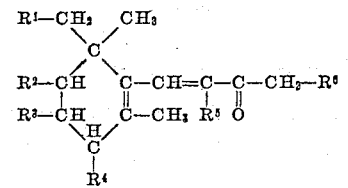

wherein each of the symbols $R^1$, $R^2$, $R^3$, $R^4$, $R^5$ and $R^6$ has the same meaning indicated above.

3. A process which comprises agitating a mixture comprising essentially pseudoionone, a liquid material containing essentially saturated aliphatic hydrocarbon having a boiling point between about 30° C. and about 100° C., and sulfuric acid having a concentration between about 93% and about 100%, at a temperature between about minus 15° C. and about 0° C., thereby forming a nuclearly unsaturated ionone product containing chiefly β-ionone.

4. A process which comprises agitating a mixture comprising essentially pseudoirone, a liquid material containing essentially saturated aliphatic hydrocarbon having a boiling point between about 30° C. and about 100° C., and sulfuric acid having a concentration between about 60% and about 65%, at a temperature between about 10° C. and about 20° C., thereby forming a nuclearly unsaturated irone product containing chiefly α-irone.

5. A process which comprises agitating a mixture comprising essentially pseudoirone, a liquid material containing essentially saturated aliphatic hydrocarbon having a boiling point between about 30° C. and about 100° C., and sulfuric acid having a concentration of about 70%, at temperatures between about minus 5° C. and about 5° C., thereby forming a mixture comprising chiefly nuclearly unsaturated irones and possessing a raspberry odor.

6. A process comprising adding slowly a solution of pseudoionone in a liquid saturated hydrocarbon having a boiling point between about 30° C. and about 100° C. to a well-stirred mixture of sulfuric acid having a concentration of about 98% and a liquid saturated hydrocarbon having a boiling point between about 30° C. and 100° C., at a temperature of about minus 10° C., thereby forming an ionone product containing not less than about 90% β-ionone.

7. A process comprising adding slowly a solution of pseudoirone in a liquid saturated hydrocarbon having a boiling point between about 30° C. and about 100° C. to a well-stirred mixture of sulfuric acid having a concentration of about 65% and a liquid saturated hydrocarbon having a boiling point between about 30° C. and 100° C., at a temperature of about 10° C., thereby forming an irone product containing not less than about 80% α-irone.

8. A process which comprises agitating a mixture consisting essentially of (a) pseudoionone, (b) a liquid material consisting essentially of saturated aliphatic hydrocarbon having a boiling point between about 30° C. and about 100° C., and (c) sulfuric acid having a concentration between about 93% and about 100%, at a temperature between about minus 15° C. and about 0° C.; said liquid material being employed in a volume at least about twice that of the pseudoionone, and said sulfuric acid being employed in a ratio of from about 1.5 to about 4 parts by weight for each part by weight of pseudoionone; thereby forming a nuclearly unsaturated ionone product containing chiefly β-ionone.

9. A process which comprises agitating a mixture consisting essentially of (a) pseudoirone, (b) a liquid material consisting essentially of saturated aliphatic hydrocarbon having a boiling point between about 30° C. and about 100° C., and (c) sulfuric acid having a concentration between about 60% and about 65%, at a temperature between about 10° C. and about 20° C.; said liquid material being employed in a volume at least about twice that of the pseudoirone, and said sulfuric acid being employed in a ratio of from about 1.5 to about 4 parts by weight for each part by weight of pseudoirone; thereby forming a nuclearly unsaturated irone product containing chiefly α-irone.

References Cited in the file of this patent

UNITED STATES PATENTS

| | | |
|---|---|---|
| 652,969 | Krauth | July 3, 1900 |
| 2,636,052 | Grutter | Apr. 21, 1953 |

OTHER REFERENCES

Royals Ind. Eng. Chem., vol. 38, pp. 546–8 (1946).

UNITED STATES PATENT OFFICE

CERTIFICATE OF CORRECTION

Patent No. 2,877,271                                March 10, 1959

Solomon Kaiser et al.

It is hereby certified that error appears in the printed specification of the above numbered patent requiring correction and that the said Letters Patent should read as corrected below.

Column 1, line 47, for the patent number "2,740,817" read -- 2,801,266 --; column 2, line 30, for the left-hand portion of formula (II) reading "$R_2$—CH5" read -- $R^2$—CH5 --; column 3, line 67, for "70°" read -- 70% --; column 6, line 8, for "methylpesudoionones" read -- methylpseudoionones --; line 13, for "pesudoionones" read -- pseudoionones --.

Signed and sealed this 21st day of July 1959.

(SEAL)
Attest:

KARL H. AXLINE                                  ROBERT C. WATSON
Attesting Officer                             Commissioner of Patents